(12) United States Patent
Robertson et al.

(10) Patent No.: US 8,896,759 B2
(45) Date of Patent: Nov. 25, 2014

(54) METHOD TO INCREASE THE ACCURACY OF PHASE CORRELATION MOTION ESTIMATION IN LOW-BIT-PRECISION CIRCUMSTANCES

(75) Inventors: Mark Robertson, Cupertino, CA (US); Ming-Chang Liu, San Jose, CA (US); Yoshihiro Murakami, Atsugi (JP); Toru Kurata, Ageo (JP); Yutaka Yoneda, Yokohama (JP)

(73) Assignee: Sony Corporation, Tokyo (JP)

( * ) Notice: Subject to any disclaimer, the term of this patent is extended or adjusted under 35 U.S.C. 154(b) by 1018 days.

(21) Appl. No.: 12/912,536

(22) Filed: Oct. 26, 2010

(65) Prior Publication Data

US 2012/0098985 A1    Apr. 26, 2012

(51) Int. Cl.
*H04N 5/14* (2006.01)
*G06T 7/20* (2006.01)

(52) U.S. Cl.
CPC ............... *H04N 5/145* (2013.01); *G06T 7/206* (2013.01); *G06T 2207/20021* (2013.01); *G06T 2207/20056* (2013.01)
USPC .......................................................... 348/699

(58) Field of Classification Search
CPC .................................................... H04N 5/145
USPC .......................................................... 348/699
See application file for complete search history.

(56) References Cited

U.S. PATENT DOCUMENTS

| | | | |
|---|---|---|---|
| 5,005,078 A | 4/1991 | Gillard | |
| 5,682,205 A | 10/1997 | Sezan et al. | |
| 5,940,145 A | 8/1999 | Burl | |
| 6,057,892 A | 5/2000 | Borer | |
| 6,075,818 A | 6/2000 | Thomson | |

(Continued)

FOREIGN PATENT DOCUMENTS

EP    2207139 A1    7/2010

OTHER PUBLICATIONS

Takita et al.,"High-Accuracy Subpixel Image Registration Based on Phase-only Correlation." Aug. 2003, IEICE Trans. Fundamentals, vol. E86-A, No. 8.

(Continued)

*Primary Examiner* — Sath V Perungavoor
*Assistant Examiner* — James Pontius
(74) *Attorney, Agent, or Firm* — Haverstock & Owens LLP

(57) ABSTRACT

A method and system to improve the performance of phase correlation motion estimation for low-bit-precision implementation are described herein. Phase correlation uses the Fast Fourier Transform (FFT) with operations with infinite-precision constants. Since physical implementations use finite-precision arithmetic, there is some loss in precision relative to the ideal infinite-precision case. In low-complexity implementations, it is desirable to use as few bits as possible, and if the precision is too low, the performance of traditional phase correlation suffers. A pre-processing technique is applied to the data prior to taking the FFT, which minimizes the negative effects of finite precision in the FFT and allows high quality results from phase correlation. The pre-processing step is a content-dependent contrast adjustment that maps the range of the input images' pixel values to the range of input values for the FFT. There is no post-processing required after the FFT to compensate for the pre-processing step.

18 Claims, 6 Drawing Sheets

(56) References Cited

U.S. PATENT DOCUMENTS

| | | | |
|---|---|---|---|
| 6,611,560 | B1 | 8/2003 | Kresch et al. |
| 7,349,583 | B2 | 3/2008 | Kumar et al. |
| 7,620,269 | B1 | 11/2009 | Nandy |
| 7,751,482 | B1 | 7/2010 | Srinivasan et al. |
| 7,751,591 | B2 | 7/2010 | Bober et al. |
| 7,809,208 | B2 * | 10/2010 | Kang .................... 382/266 |
| 7,831,065 | B2 | 11/2010 | Zimmermann et al. |
| 8,155,452 | B2 | 4/2012 | Minear |
| 8,233,730 | B1 | 7/2012 | Namboodiri et al. |
| 8,285,079 | B2 | 10/2012 | Robertson et al. |
| 8,311,116 | B2 | 11/2012 | Namboodiri et al. |
| 2002/0097342 | A1 | 7/2002 | Hu |
| 2004/0179594 | A1 | 9/2004 | Biswas et al. |
| 2005/0105812 | A1 | 5/2005 | Molino et al. |
| 2005/0219642 | A1 | 10/2005 | Yachida et al. |
| 2011/0176013 | A1 | 7/2011 | Robertson et al. |
| 2011/0229056 | A1 * | 9/2011 | Robertson et al. ......... 382/294 |

OTHER PUBLICATIONS

Turin, George., "An Introduction to Matched Filters", IRE Transactions of Information Theory, pp. 311-329, Jan. 23, 1960, Hughes Research Laboratories, Malibu, CA.

Yeping Su, "Robust Global Motion Estimation form Coarsely Sampled Motion Vetor Fields", Department of Electrical Engineering, University of Washington, Box 352500, Seattle, WA 98195, CCL/ITRI, Taiwan, http://spiedigitallibary.org/ on Mar. 5, 2014 Terms of Use: http://spiedl.org/terms, Image and Video Communications and Processing 2003, SPIE vol. 5022, pp. 98-101.

Biswas et al., "A Novel De-Interlacing Technique Based on Phase Plane Correlation Motion Estimation", University of California, pp. 1-4, 2003.

Molino et al., "Low Complexity Video Codec for Mobile Video Conferencing", pp. 665-668, Sep. 2004.

G.A. Thomas, et al., "Television Motion Measurement for Datv and Other Applications", (PH-283), XP000611063, pp. 1-20, Sep. 1987.

* cited by examiner

METHOD TO INCREASE THE ACCURACY OF PHASE CORRELATION MOTION ESTIMATION IN LOW-BIT-PRECISION CIRCUMSTANCES

FIELD OF THE INVENTION

The present invention relates to the field of image/video processing. More specifically, the present invention relates to performing phase correlation motion estimation.

BACKGROUND OF THE INVENTION

The process of performing motion estimation is able to be implemented in a number of ways. One implementation includes utilizing phase correlation. Phase correlation uses the Fast Fourier Transform (FFT) to estimate the offset between two similar images. In floating point implementations, the FFT is able to be computed with high precision. However, floating point arithmetic is too computationally complex for some applications, and a less demanding format such as fixed point is often used instead. Fixed point allows numbers to be represented with fewer bits and allows arithmetic with those numbers to be implemented more efficiently. For such fixed-point implementations, the FFT yields output values with limited precision, which reduces the performance of the phase correlation motion estimation.

SUMMARY OF THE INVENTION

A method and system to improve the performance of phase correlation motion estimation for low-bit-precision implementation are described herein. Phase correlation uses the Fast Fourier Transform (FFT) with operations with infinite-precision constants. Since physical implementations use finite-precision arithmetic, there is some loss in precision relative to the ideal infinite-precision case. In low-complexity implementations, it is desirable to use as few bits as possible, and if the precision is too low, the performance of traditional phase correlation suffers. A pre-processing technique is applied to the data prior to taking the FFT, which minimizes the negative effects of finite precision in the FFT and allows high quality results from phase correlation even when few bits are used for performing the FFT. The pre-processing step is a content-dependent contrast adjustment that maps the range of the input images' pixel values, to the range of input values for the FFT. There is no post-processing required after the FFT to compensate for the pre-processing step.

In one aspect, a method of estimating motion in a video programmed in a memory in a device comprises performing contrast pre-processing on the video to generate pre-processed data and performing phase correlation on the video using the pre-processed data. Performing contrast pre-processing further comprises computing minimum pixel values in an N×N input window, computing maximum pixel values in the N×N input window and re-scaling the pixels in the window to produce an N×N re-scaled output window. The re-scaled output window has a dynamic range of pixels equal to the dynamic range of the input to a Fast Fourier Transform component. Phase correlation further comprises applying a window function to a window of a current frame to obtain a current frame result, applying a Fast Fourier Transform to the current frame result yielding a first set of complex values, applying the window function to the window of a reference frame to obtain a reference frame result, applying the Fast Fourier Transform to the reference frame result yielding a second set of complex values, normalizing a product of the second set of complex values and a complex conjugate of the first set of complex values, computing an inverse Fast Fourier Transform to yield a phase correlation surface and identifying one or more peaks from the phase correlation surface, wherein indices of the peaks correspond to possible motions. Performing contrast pre-processing occurs before applying a windowing function. Performing contrast pre-processing occurs after applying a windowing function. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In another aspect, a system for estimating motion in a video programmed in a memory in a device comprises a pre-processing module for performing contrast pre-processing on the video to generate pre-processed data and a phase correlation module for performing phase correlation on the video using the pre-processed data. The pre-processing module further comprises a minimum pixel value module for computing minimum pixel values in an N×N input window, a maximum pixel value module for computing maximum pixel values in the N×N input window and a re-scaling module for re-scaling the pixels in the window to produce an N×N re-scaled output window. The re-scaled output window has a dynamic range of pixels equal to the dynamic range of the input to a Fast Fourier Transform component. The phase correlation module further comprises a first window function module for applying a window function to a window of a current frame to obtain a current frame result, a first Fast Fourier Transform module for applying a Fast Fourier Transform to the current frame result yielding a first set of complex values, a second window function module for applying the window function to the window of a reference frame to obtain a reference frame result, a second Fast Fourier Transform module for applying the Fast Fourier Transform to the reference frame result yielding a second set of complex values, a normalizing module for normalizing a product of the second set of complex values and a complex conjugate of the first set of complex values, an inverse Fast Fourier Transform module for Computing an inverse Fast Fourier Transform to yield a phase correlation surface and a peak identification module for identifying one or more peaks from the phase correlation surface, wherein indices of the peaks correspond to possible motions. Performing contrast pre-processing occurs before applying a windowing function. Performing contrast pre-processing occurs after applying a windowing function. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In another aspect, a device for estimating motion in a video comprises a memory for storing an application, the application for performing contrast pre-processing on the video to generate pre-processed data and performing phase correlation on the video using the pre-processed data and a processing component coupled to the memory, the processing component configured for processing the application. Performing contrast pre-processing further comprises computing minimum pixel values in an N×N input window, computing maximum pixel values in the N×N input window and a re-scaling module for re-scaling the pixels in the window to produce an N×N re-scaled output window. The re-scaled output window has a dynamic range of pixels equal to the dynamic range of the input to a Fast Fourier Transform component. Phase correlation further comprises applying a window function to a window of a current frame to obtain a current frame result, applying a Fast Fourier Transform to the current frame result yielding a first set of complex values, applying the window function to the window of a reference frame to obtain a reference frame result, applying the Fast Fourier Transform to the reference frame result yielding a second set of complex values, normalizing a product of the second set of complex values and a complex conjugate of the first set of complex values, computing an inverse Fast Fourier Transform to yield a phase correlation surface and identifying one or more peaks from the phase correlation surface, wherein indices of the peaks correspond to possible motions. Performing contrast pre-processing occurs before applying a windowing function. Performing contrast pre-processing occurs after applying a windowing function.

In yet another aspect, a camera device comprises a video acquisition component for acquiring a video, an encoder for encoding the image, including motion estimation, by performing contrast pre-processing on the video to generate pre-processed data and performing phase correlation on the video using the pre-processed data and a memory for storing the encoded video. Performing contrast pre-processing further comprises computing minimum pixel values in an N×N input window, computing maximum pixel values in the N×N input window and a re-scaling module for re-scaling the pixels in the window to produce an N×N re-scaled output window. The re-scaled output window has a dynamic range of pixels equal to the dynamic range of the input to a Fast Fourier Transform component. Phase correlation further comprises applying a window function to a window of a current frame to obtain a current frame result, applying a Fast Fourier Transform to the current frame result yielding a first set of complex values, applying the window function to the window of a reference frame to obtain a reference frame result, applying the Fast Fourier Transform to the reference frame result yielding a second set of complex values, normalizing a product of the second set of complex values and a complex conjugate of the first set of complex values, computing an inverse Fast Fourier Transform to yield a phase correlation surface and identifying one or more peaks from the phase correlation surface, wherein indices of the peaks correspond to possible motions. Performing contrast pre-processing occurs before applying a windowing function. Performing contrast pre-processing occurs after applying a windowing function.

DETAILED DESCRIPTION OF THE PREFERRED EMBODIMENT

Motion estimation is the process of determining motion vectors that describe the transformation from one image to another. Motion estimation is able to be performed between images or image blocks. There are many implementations of motion estimation, one of which is phase correlation.

Figure 1:
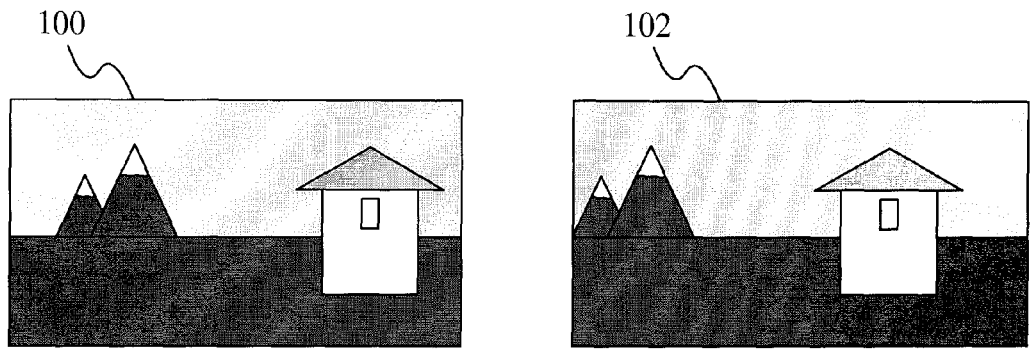
FIG. 1 illustrates two images whose motion is able to be estimated.

FIG. 1 illustrates two images whose motion is able to be estimated. Image 102 is the same scene as image 100, but the camera has panned to the right in the image 102. If the images are aligned by estimating the motion between them, there are numerous possible applications. One such application is to stitch them together as part of a panoramic image, which is able to be further extended spatially by continuing the process with more images as the camera pans further right. Another application is to reduce noise by averaging together pixel observations that correspond to the same location in both images. Motion estimation is also commonly used to form motion-compensated predictions as part of video compression. There are many other applications as well.

Phase correlation is able to be applied to an entire image or to sub-blocks within an image. Although application to image sub-blocks is described herein, application to the whole image is accomplished by letting the block size and window size cover the entire image.

Figure 2:
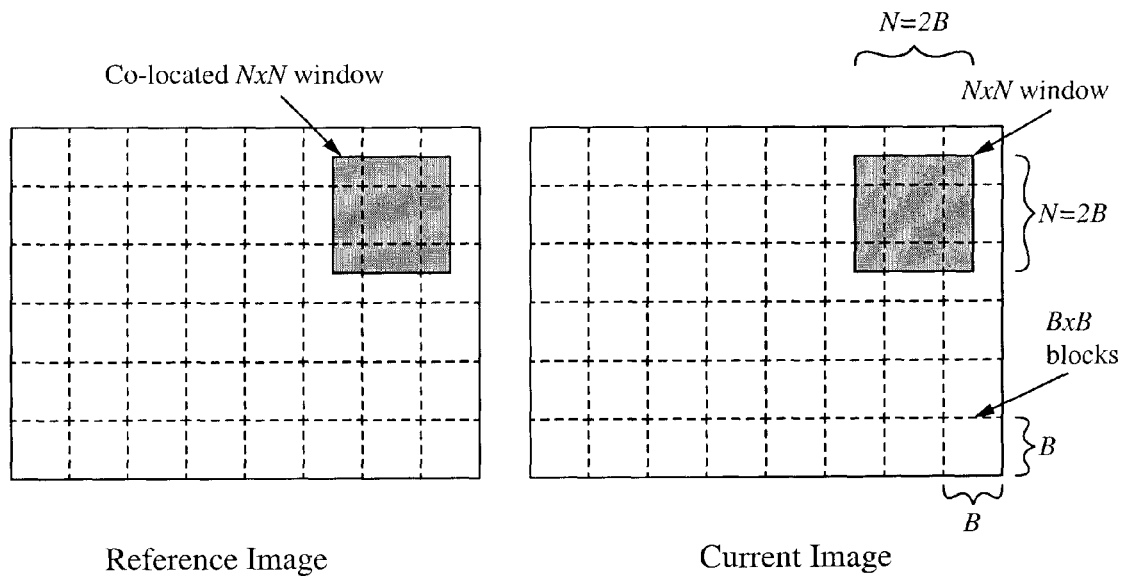
FIG. 2 illustrates an example of co-located blocks.

Local motion analysis is performed on each B×B block in an image. Phase correlation estimates motion by considering a window that surrounds the B×B target block. A surrounding window size of N×N where N=2B is used, but in general other window sizes and shapes are able to be used. Phase correlation considers an N×N window in both the current image and the reference image, where the windows are able to be co-located or, in the more general case, an offset is able to be present for the block in the reference frame due to a motion predictor. FIG. 2 illustrates an example of co-located blocks.

Figure 3:
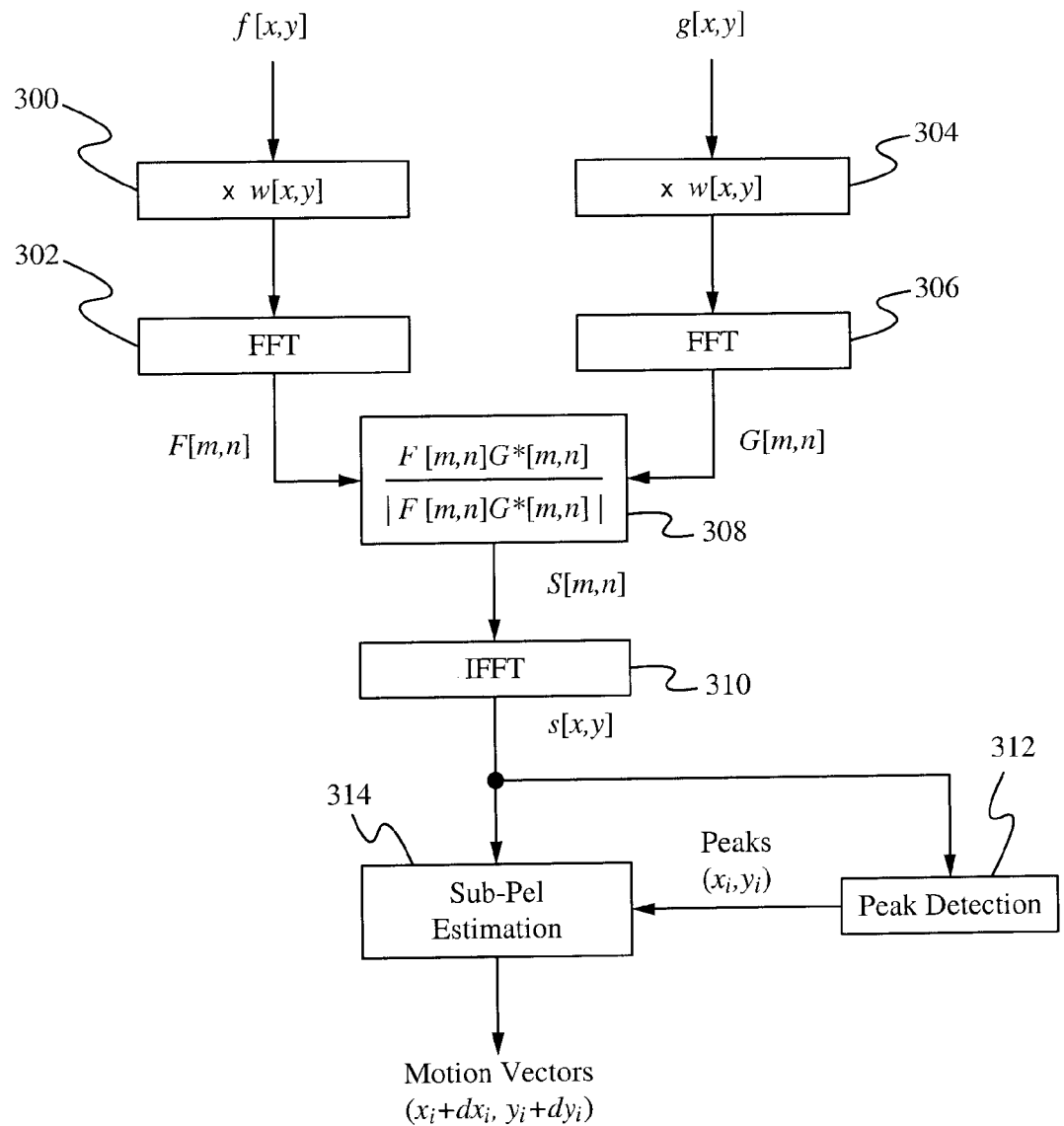
FIG. 3 illustrates a flowchart of phase correlation according to some embodiments.

FIG. 3 illustrates a flowchart of phase correlation according to some embodiments. In the step 300, point-wise multiplication of the N×N window in the reference frame with window function w[x,y] is performed. In the step 302, a Fast Fourier Transform (FFT) is applied to the result, which yields the complex values F[m,n]. In the step 304, point-wise multiplication of the N×N window in the current frame is performed with the window function w[x,y]. In the step 306, a FFT is applied to the result, which yields the complex values G[m,n]. In the step 308, in the normalization stage, the following equation is computed:

$$S[m,n] = \frac{F[m,n]G^*[m,n]}{|F[m,n]G^*[m,n]|},$$

where * denotes the complex conjugate, and | | represents the magnitude of the complex argument. In the step 310, the inverse FFT (IFFT) of S[m,n] is computed to yield s[x,y], the phase correlation surface. In the step 312, the K biggest peaks are identified from the phase correlation surface. The indices of these peaks correspond to possible motions that are present between the N×N windows in the current and reference frames. The indices of these peaks are denoted as $(x_i, y_i)$, i=0, ..., K−1. The indices are positive integers in 0, 1, ..., N−1. A negative motion of −q leads to a peak at index position N−q. In the step 314, if sub-pixel precision is used, sub-pixel estimates ($dx_i$, $dy_i$) are computed for the peaks ($x_i$, $y_i$) previously identified.

For the window function, a 2-D separable extension of the Hamming window is used, $w[x,y]=w[x]w[y]$, $$w[x] = \begin{cases} 0.53836 - 0.46164\cos\left(\frac{2\pi x}{N-1}\right) & x = 0, 1, \ldots, N-1 \\ 0, & \text{else} \end{cases}.$$

Other implementations are able to be used as well, such as a Hann window, a Blackman window, a Bartlett window or any other window.

The peaks in the correlation surface represent possible motions. Larger peaks indicate higher correlation, and the largest peak often indicates the dominant motion in the N×N window.

Contrast stretching to accommodate reduced precision FFT is described herein. In floating point implementations, the FFT of the windowed input image blocks $f[x,y]$ and $g[x,y]$ are able to be computed with high precision. However, floating point arithmetic is too computationally complex for some applications, and a less demanding format such as fixed point is often used instead. Fixed point allows numbers to be represented with fewer bits, and allows arithmetic with those numbers to be implemented more efficiently. For such fixed-point reduced bit precision implementations, the FFT might only yield output values with P total bits of precision. In such cases, to maintain good performance from phase correlation, it is important to use as many of the P bits as possible; otherwise, precision is unnecessarily lost. Reduced precision in FFT output values is able to be modeled as adding quantization error (or noise) to the outputs $F[m,n]$ and $G[m,n]$, which has the effect of increasing the error in the overall phase correlation procedure.

The range of inputs to the reduced-precision FFT are denoted as $[I_{min}, I_{max}]$. This is the maximum range of input values that the FFT is designed to process. Since the FFT uses reduced precision, if the inputs to the FFT occupy only a small fraction of the input dynamic range $[I_{min}, I_{max}]$, then only a small fraction of the bits at the FFT output is being used. Such situations are able to occur for low-contrast image content, in which case phase correlation's resulting decrease in performance (relative to a floating-point implementation) is able to be dramatic.

To prevent excessive loss in precision in the phase correlation algorithm due to low-contrast image content and finite-precision FFTs, the following pre-processing procedure is applied to an image block input[x,y] to yield the output block output[x,y]:

1. Compute the minimum pixel values in the N×N input window:

$$a = \min_{x,y} \text{input}[x, y] \tag{1}$$

2. Compute the maximum pixel values in the N×N input window:

$$b = \max_{x,y} \text{input}[x, y] \tag{2}$$

3. Re-scale the input image window to produce the output image window as follows:

$$\text{output}[x, y] = I_{min} + \frac{\text{input}[x, y] - a}{b - a}(I_{max} - I_{min}) \tag{3}$$

Rounding of output[x,y] may be utilized depending on the precision of input data for the FFT. To preserve the sign of positive-valued input values common to image processing, $I_{min}$ is able to be set to 0 in the above procedure.

Figure 4:
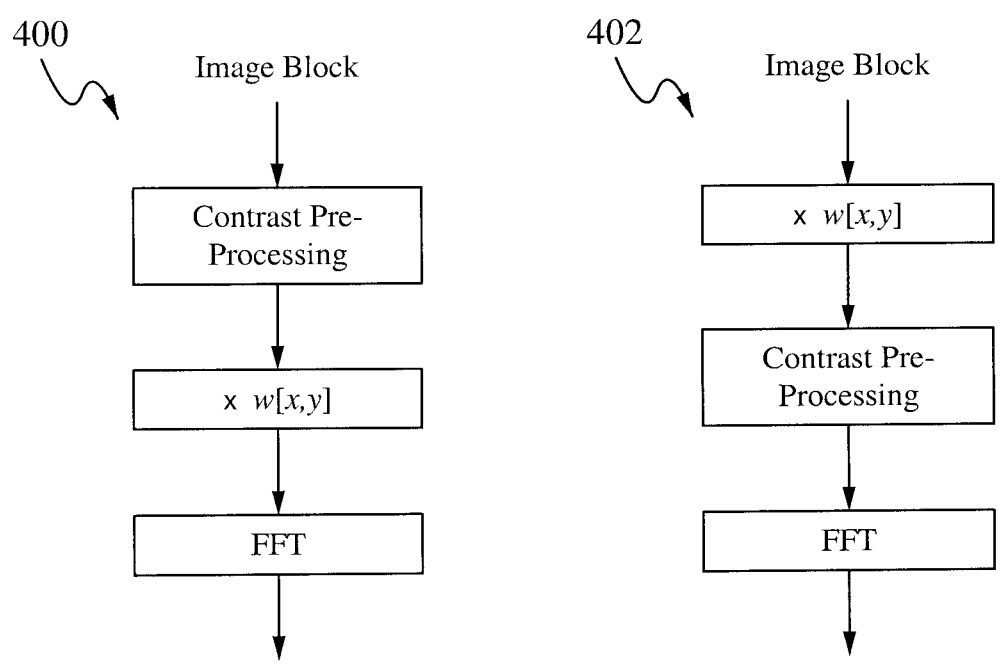
FIG. 4 illustrates two possible configurations that use the pre-processing procedure according to some embodiments.

FIG. 4 illustrates two possible configurations that use the above pre-processing procedure according to some embodiments. The left-most configuration 400 in FIG. 4 performs the contrast pre-processing on the image window, which is followed by multiplication with the window function $w[x,y]$, which is in turn followed by the FFT. Alternatively, the order is able to be changed slightly as shown in the right-most configuration 402 in FIG. 4. The image window is first multiplied by the window function $w[x,y]$, which is followed by contrast pre-processing, which is in turn followed by the FFT. Both procedures extend the dynamic range of the input to the FFT module and improve phase correlation performance for low-contrast input images.

The pre-processing step is content-dependent, meaning that different input image windows will be processed with different input-output relationships in Equation (3). This is different from other scaling methods that simply map the full range of possible input values (which is fixed) to $[I_{min}, I_{max}]$. Also, there is no output scaling after the FFT to match the input scaling as might be present in a more general FFT application.

The effect of the contrast pre-processing on the actual phase correlation algorithm is discussed herein. The function $f_p[x,y]$ is denoted as the result of contrast pre-processing the input image block $f[x,y]$, and $g_p[x,y]$ is denoted as the result of contrast pre-processing the other input image block $g[x,y]$. The effect of the windowing function $w[x,y]$ is able to be neglected, which is equivalent to using a box window with $w[x,y]=1$. Using such a window function simplifies processing and implies that the two configurations in FIG. 4 are equivalent.

Using well known properties of the Fourier Transform:

$$\text{FFT}\{f_p[x,y]\} = K_f F[m,n] + L_f \delta[m,n]$$

$$\text{FFT}\{g_p[x,y]\} = K_g G[m,n] + L_g \delta[m,n],$$

where $K_f$, $K_g$, $L_f$ and $L_g$ are constants that depend on $I_{min}$, $I_{max}$ and the minima and maxima of $f[x,y]$ and $g[x,y]$; and $\delta[m,n]$ is the discrete delta function, defined as $$\delta[m, n] = \begin{cases} 1 & m = n = 0 \\ 0 & \text{otherwise} \end{cases}.$$

Thus, the FFT of the contrast-adjusted image blocks is a scaled version of the FFT of the original image blocks, with an additional delta function centered at DC. During the normalization stage of phase correlation, the transform values are divided by their magnitude:

$$S[m, n] = \frac{K_f F[m, n] + L_f \delta[m, n]}{|k_f F[m, n] + L_f \delta[m, n]|} \times \frac{K_g G^*[m, n] + L_g \delta[m, n]}{|K_g G^*[m, n] + L_g \delta[m, n]|}$$
$$= \frac{F[m, n]}{|F[m, n]|} \frac{G^*[m, n]}{|G^*[m, n]|}$$

Thus, from a mathematical point of view (or for a high-precision FFT implementation), using the contrast-adjusted input image blocks yields the same results as using the original input image blocks. However, for reduced-precision FFT implementations, using the contrast-adjusted image blocks makes maximum use of the precision available at the FFT output. This allows phase correlation with lower-precision FFTs to provide good results even for low-contrast input images. In practice with low-precision FFT implementations, using this contrast pre-processing has little effect for high-contrast imagery, but significant improvement for low-contrast imagery.

Since the normalization stage cancels the effect of the pre-processing, scaling at the FFT output is not needed to match the scaling prior to the FFT input. Due to phase correlation's normalization for computing S[m,n], there is no need for contrast pre-processing for the IFFT routine.

Figure 5:
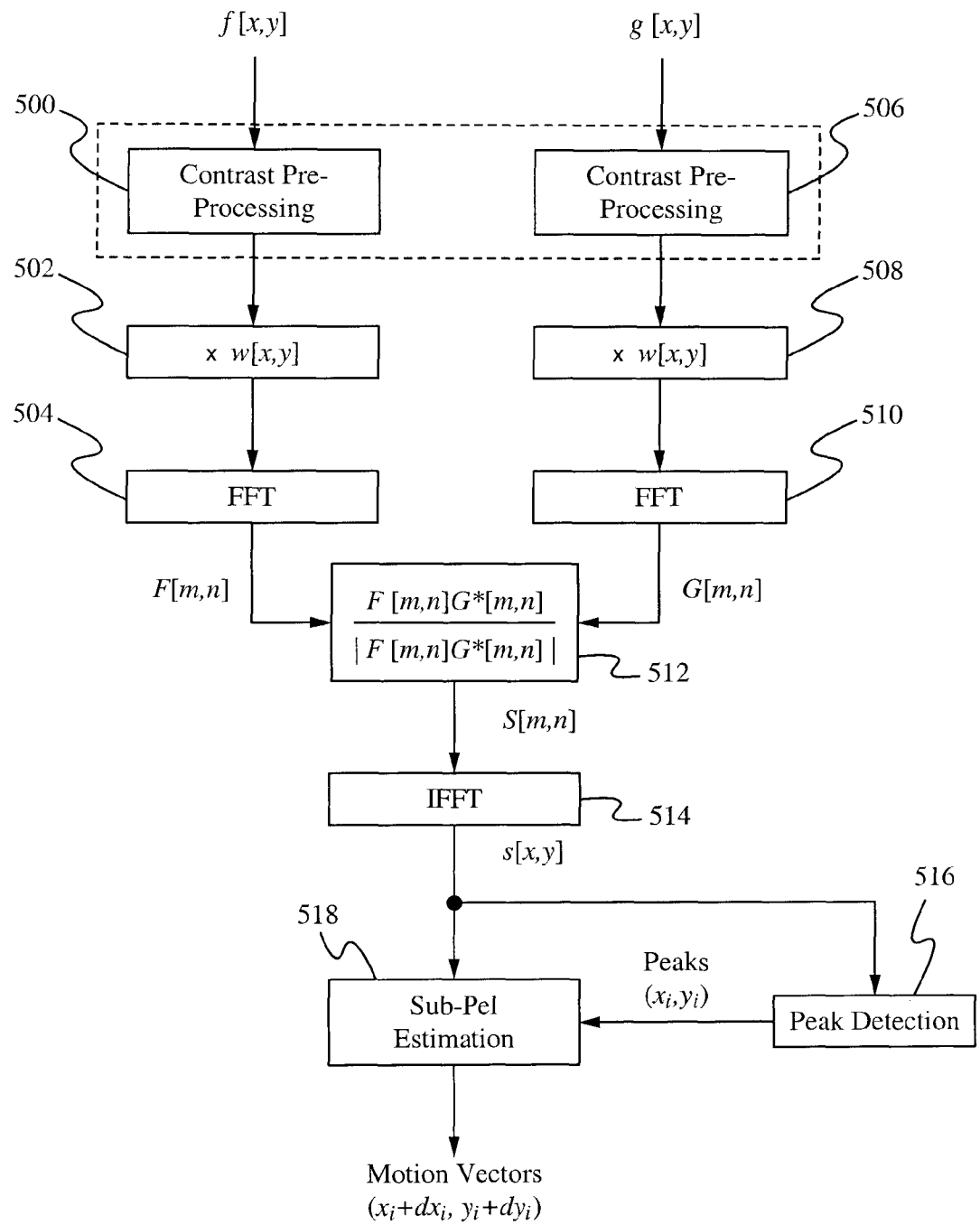
FIG. 5 illustrates a block diagram of how the contrast adjustment fits within the overall phase correlation algorithm according to some embodiments.

FIG. 5 illustrates a block diagram of how the contrast adjustment fits within the overall phase correlation algorithm according to the left-most configuration of FIG. 4. In the step 500, contrast pre-processing is implemented. In the step 502, point-wise multiplication of the N×N window in the reference frame with window function w[x,y] is performed. In the step 504, a FFT is applied to the result, which yields the complex values F[m,n]. In the step 506, contrast pre-processing is implemented. In the step 508, point-wise multiplication of the N×N window in the current frame is performed with the window function w[x,y]. In the step 510, a FFT is applied to the result, which yields the complex values G[m,n]. In the step 512, in the normalization stage, the following equation is computed:

$$S[m, n] = \frac{F[m, n]G^*[m, n]}{|F[m, n]G^*[m, n]|},$$

where * denotes the complex conjugate, and | | represents the magnitude of the complex argument. In the step 514, the IFFT of S[m,n] is computed to yield s[x,y], the phase correlation surface. In the step 516, the K biggest peaks are identified from the phase correlation surface. The indices of these peaks correspond to possible motions that are present between the N×N windows in the current and reference frames. The indices of these peaks are denoted as $(x_i, y_i)$, i=0, . . . , K−1. The indices are positive integers in 0, 1, . . . , N−1. A negative motion of −q leads to a peak at index position N−q. In the step 518, if sub-pixel precision is used, sub-pixel estimates ($dx_i$, $dy_i$) are computed for the peaks $(x_i, y_i)$ previously identified. As described above, any window is able to be used for the window function. The peaks in the correlation surface represent possible motions. Larger peaks indicate higher correlation, and the largest peak often indicates the dominant motion in the N×N window.

Figure 6:
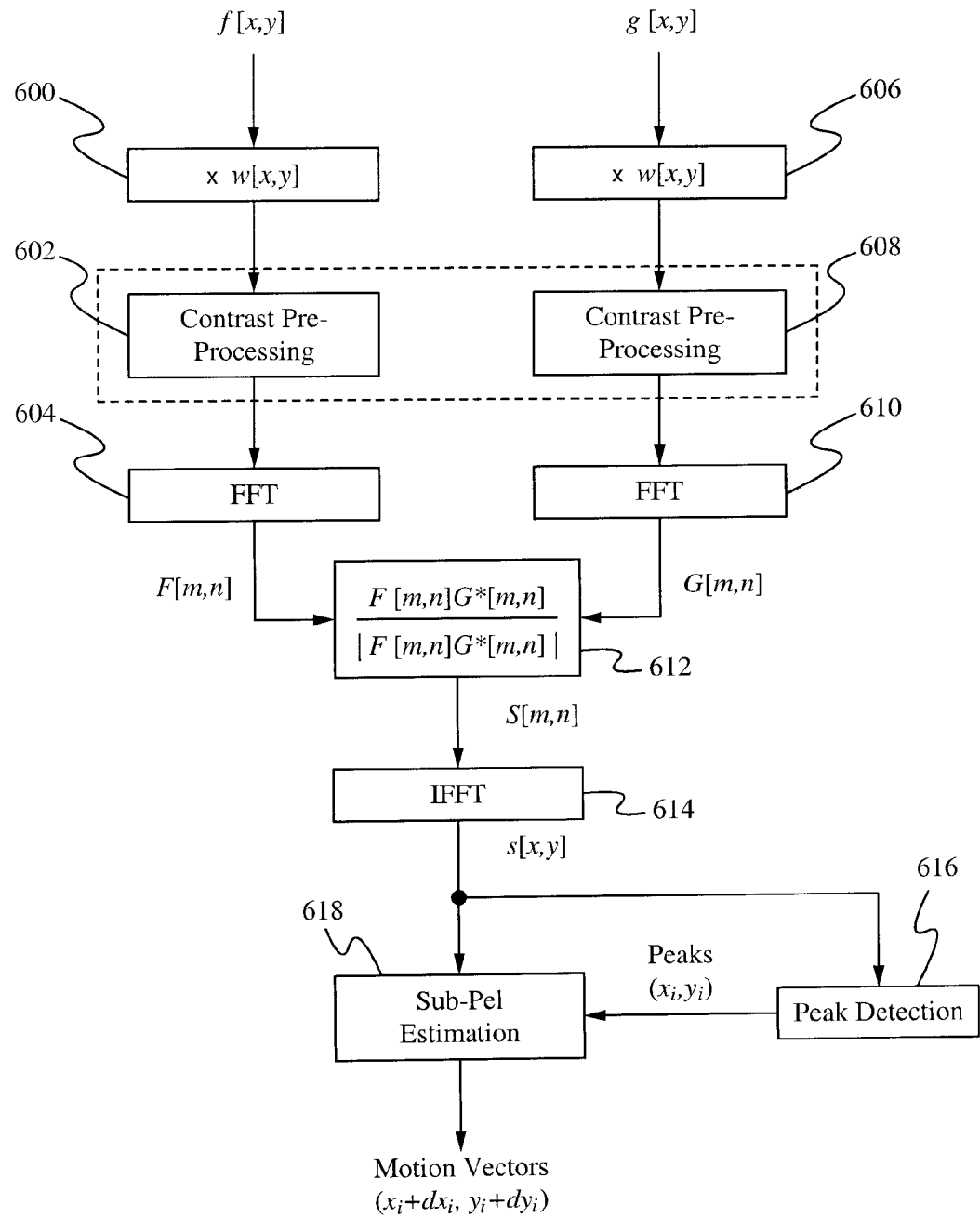
FIG. 6 illustrates a block diagram of how the contrast adjustment fits within the overall phase correlation algorithm according to some embodiments.

FIG. 6 illustrates a block diagram of how the contrast adjustment fits within the overall phase correlation algorithm according to the right-most configuration of FIG. 4. In the step 600, point-wise multiplication of the N×N window in the reference frame with window function w[x,y] is performed. In the step 602, contrast pre-processing is implemented. In the step 604, a FFT is applied to the result, which yields the complex values F[m,n]. In the step 606, point-wise multiplication of the N×N window in the current frame is performed with the window function w[x,y]. In the step 608, contrast pre-processing is implemented. In the step 610, a FFT is applied to the result, which yields the complex values G[m,n]. In the step 612, in the normalization stage, the following equation is computed:

$$S[m, n] = \frac{F[m, n]G^*[m, n]}{|F[m, n]G^*[m, n]|},$$

where * denotes the complex conjugate, and | | represents the magnitude of the complex argument. In the step 614, the IFFT of S[m,n] is computed to yield s[x,y], the phase correlation surface. In the step 616, the K biggest peaks are identified from the phase correlation surface. The indices of these peaks correspond to possible motions that are present between the N×N windows in the current and reference frames. The indices of these peaks are denoted as $(x_i, y_i)$, i=0, . . . , K−1. The indices are positive integers in 0, 1, . . . , N−1. A negative motion of −q leads to a peak at index position N−q. In the step 618, if sub-pixel precision is used, sub-pixel estimates ($dx_i$, $dy_i$) are computed for the peaks $(x_i, y_i)$ previously identified. As described above, any window is able to be used for the window function. The peaks in the correlation surface represent possible motions. Larger peaks indicate higher correlation, and the largest peak often indicates the dominant motion in the N×N window.

Figure 7:
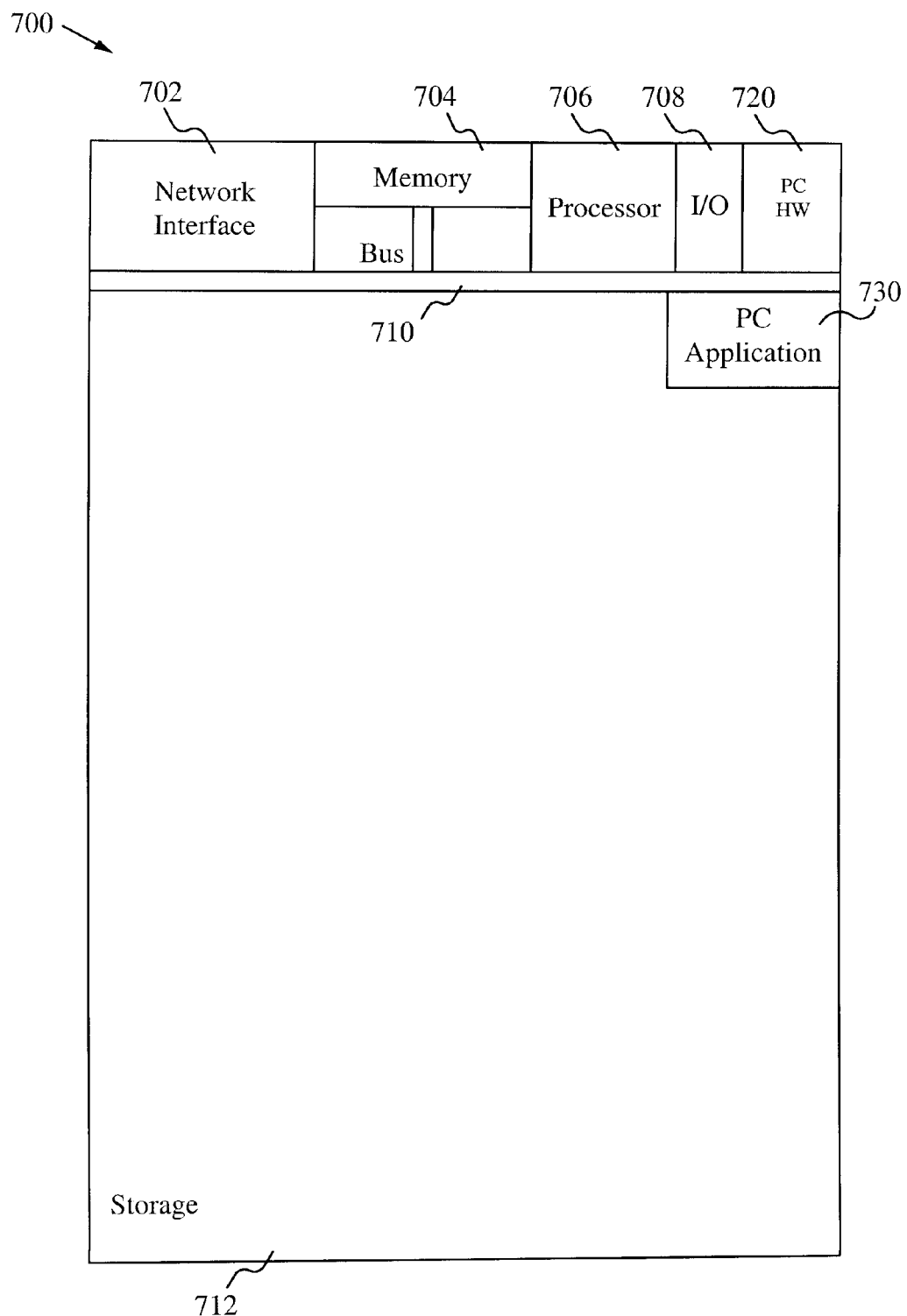
FIG. 7 illustrates a block diagram of an exemplary computing device configured to implement the method to increase the accuracy of phase correlation according to some embodiments.

FIG. 7 illustrates a block diagram of an exemplary computing device 700 configured to implement the method to increase the accuracy of phase correlation according to some embodiments. The computing device 700 is able to be used to acquire, store, compute, communicate and/or display information such as images and videos. For example, a computing device 700 is able to acquire and store an image or a video. The method to increase the accuracy of phase correlation is able to be used when encoding an image or a video on the device 700. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, display, printer, modem, touchscreen, button interface and other devices. Modified phase correlation application(s) 730 used to perform the method to increase accuracy of phase correlation are likely to be stored in the storage device 712 and memory 704 and processed as applications are typically processed. More or less components than shown in FIG. 7 are able to be included in the computing device 700. In some embodiments, modified phase correlation hardware 720 is included. Although the computing device 700 in FIG. 7 includes applications 730 and hardware 720 for modified phase correlation, the method to increase accuracy of phase correlation is able to be implemented on a computing device in hardware, firmware, software or any combination thereof.

In some embodiments, the modified phase correlation application(s) 730 include several applications and/or modules. In some embodiments, the modified phase correlation application(s) 730 include a pre-processing module for performing contrast pre-processing on the video to generate pre-processed data and a phase correlation for performing phase correlation on the video using the pre-processed data. In some embodiments, the pre-processing module includes sub-modules such as a minimum pixel value module for computing minimum pixel values in an N×N input window, a maximum pixel value module for computing maximum pixel values in the N×N input window and a re-scaling module for re-scaling the pixels in the window to produce an N×N re-scaled output window. The re-scaled output window has a dynamic range of its pixels equal to the dynamic range of the input to the FFT implementation. In some embodiments, the phase correlation module includes sub-modules such as a first window function module for applying a window function to a window of a current frame to obtain a current frame result, a first FFT module for applying a Fast Fourier Transform to the current frame result yielding a first set of complex values, a second window function module for applying the window function to the window of a reference frame to obtain a reference frame result, a second FFT module for applying the Fast Fourier Transform to the reference frame result yielding a second set of complex values, a normalizing module for normalizing a product of the second set of complex values and a complex conjugate of the first set of complex values, an IFFT module for computing an inverse Fast Fourier Transform to yield a phase correlation surface and a peak identification module for identifying one or more peaks from the phase correlation surface, wherein indices of the peaks correspond to possible motions. In some embodiments, fewer or additional modules and/or sub-modules are able to be included. For example, in some embodiments, the Fast Fourier Transforms and the inverse Fast Fourier Transform are computed in a single module, or the Fast Fourier Transforms are computed in one module and the inverse Fast Fourier Transform is computed in another module.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-Ray® writer/player, a television, a home entertainment system or any other suitable computing device.

To utilize the method to increase the accuracy of phase correlation, a user displays images or video such as on a digital camcorder, digital camera or television, and while the images or video are displayed, the method to increase the accuracy of phase correlation automatically performs the improved motion estimation, so that the images or video are displayed smoothly, with less noise, with improved dynamic range, or such that some other desired feature is achieved. The method to increase the accuracy of phase correlation occurs automatically without user involvement. In some implementations, the modified phase correlation is used while acquiring images or video.

In operation, the method to increase the accuracy of phase correlation performs phase correlation by pre-processing the data before taking the FFT. By pre-processing the data before the FFT, the negative effects of finite precision in the FFT are avoided, which enables high quality results from phase correlation even when few bits are used for performing the FFT. The pre-processing step maps the range of the input images' pixel values to the range of input values for the FFT. There is no post-processing required after the FFT to compensate for the pre-processing step. Low-complexity devices that are not able to take advantage of high-precision arithmetic such as digital cameras/camcorders, mobile telephones and other general mobile devices where power and complexity are a concern are able to benefit from the modified phase correlation.

Some Embodiments of Method to Increase the Accuracy of Phase Correlation Motion Estimation in Low-Bit-Precision Circumstances 1. A method of estimating motion in a video programmed in a memory in a device comprising:
   a. performing contrast pre-processing on the video to generate pre-processed data; and
   b. performing phase correlation on the video using the pre-processed data.
2. The method of clause 1 wherein performing contrast pre-processing further comprises:
   a. computing minimum pixel values in an N×N input window;
   b. computing maximum pixel values in the N×N input window; and
   c. re-scaling the pixels in the window to produce an N×N re-scaled output window.
3. The method of clause 2 wherein the re-scaled output window has a dynamic range of pixels equal to the dynamic range of the input to a Fast Fourier Transform component.
4. The method of clause 1 wherein phase correlation further comprises:
   a. applying a window function to a window of a current frame to obtain a current frame result;
   b. applying a Fast Fourier Transform to the current frame result yielding a first set of complex values;
   c. applying the window function to the window of a reference frame to obtain a reference frame result;
   d. applying the Fast Fourier Transform to the reference frame result yielding a second set of complex values;
   e. normalizing a product of the second set of complex values and a complex conjugate of the first set of complex values;
   f. computing an inverse Fast Fourier Transform to yield a phase correlation surface; and
   g. identifying one or more peaks from the phase correlation surface, wherein indices of the peaks correspond to possible motions.
5. The method of clause 1 wherein performing contrast pre-processing occurs before applying a windowing function.
6. The method of clause 1 wherein performing contrast pre-processing occurs after applying a windowing function.
7. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
8. A system for estimating motion in a video programmed in a memory in a device comprising:
   a. a pre-processing module for performing contrast pre-processing on the video to generate pre-processed data; and b. a phase correlation module for performing phase correlation on the video using the pre-processed data.
9. The system of clause 8 wherein the pre-processing module further comprises:
   a. a minimum pixel value module for computing minimum pixel values in an N×N input window;
   b. a maximum pixel value module for computing maximum pixel values in the N×N input window; and
   c. a re-scaling module for re-scaling the pixels in the window to produce an N×N re-scaled output window.
10. The system of clause 9 wherein the re-scaled output window has a dynamic range of pixels equal to the dynamic range of the input to a Fast Fourier Transform component.
11. The system of clause 8 wherein the phase correlation module further comprises:
   a. a first window function module for applying a window function to a window of a current frame to obtain a current frame result;
   b. a first Fast Fourier Transform module for applying a Fast Fourier Transform to the current frame result yielding a first set of complex values;
   c. a second window function module for applying the window function to the window of a reference frame to obtain a reference frame result;
   d. a second Fast Fourier Transform module for applying the Fast Fourier Transform to the reference frame result yielding a second set of complex values;
   e. a normalizing module for normalizing a product of the second set of complex values and a complex conjugate of the first set of complex values;
   f. an inverse Fast Fourier Transform module for computing an inverse Fast Fourier Transform to yield a phase correlation surface; and
   g. a peak identification module for identifying one or more peaks from the phase correlation surface, wherein indices of the peaks correspond to possible motions.
12. The system of clause 8 wherein performing contrast pre-processing occurs before applying a windowing function.
13. The system of clause 8 wherein performing contrast pre-processing occurs after applying a windowing function.
14. The system of clause 8 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
15. A device for estimating motion in a video comprising:
   a. a memory for storing an application, the application for:
      i. performing contrast pre-processing on the video to generate pre-processed data; and
      ii. performing phase correlation on the video using the pre-processed data; and
   b. a processing component coupled to the memory, the processing component configured for processing the application.
16. The device of clause 15 wherein performing contrast pre-processing further comprises:
   a. computing minimum pixel values in an N×N input window;
   b. computing maximum pixel values in the N×N input window; and
   c. a re-scaling module for re-scaling the pixels in the window to produce an N×N re-scaled output window.
17. The device of clause 16 wherein the re-scaled output window has a dynamic range of pixels equal to the dynamic range of the input to a Fast Fourier Transform component.
18. The device of clause 15 wherein phase correlation further comprises:
   a. applying a window function to a window of a current frame to obtain a current frame result;
   b. applying a Fast Fourier Transform to the current frame result yielding a first set of complex values;
   c. applying the window function to the window of a reference frame to obtain a reference frame result;
   d. applying the Fast Fourier Transform to the reference frame result yielding a second set of complex values;
   e. normalizing a product of the second set of complex values and a complex conjugate of the first set of complex values;
   f. computing an inverse Fast Fourier Transform to yield a phase correlation surface; and
   g. identifying one or more peaks from the phase correlation surface, wherein indices of the peaks correspond to possible motions.
19. The device of clause 15 wherein performing contrast pre-processing occurs before applying a windowing function.
20. The device of clause 15 wherein performing contrast pre-processing occurs after applying a windowing function.
21. A camera device comprising:
   a. a video acquisition component for acquiring a video;
   b. an encoder for encoding the image, including motion estimation, by:
      i. performing contrast pre-processing on the video to generate pre-processed data; and
      ii. performing phase correlation on the video using the pre-processed data; and
   c. a memory for storing the encoded video.
22. The camera device of clause 21 wherein performing contrast pre-processing further comprises:
   a. computing minimum pixel values in an N×N input window;
   b. computing maximum pixel values in the N×N input window; and
   c. a re-scaling module for re-scaling the pixels in the window to produce an N×N re-scaled output window.
23. The camera device of clause 22 wherein the re-scaled output window has a dynamic range of pixels equal to the dynamic range of the input to a Fast Fourier Transform component.
24. The camera device of clause 21 wherein phase correlation further comprises:
   a. applying a window function to a window of a current frame to obtain a current frame result;
   b. applying a Fast Fourier Transform to the current frame result yielding a first set of complex values;
   c. applying the window function to the window of a reference frame to obtain a reference frame result;
   d. applying the Fast Fourier Transform to the reference frame result yielding a second set of complex values;
   e. normalizing a product of the second set of complex values and a complex conjugate of the first set of complex values;
   f. computing an inverse Fast Fourier Transform to yield a phase correlation surface; and
   g. identifying one or more peaks from the phase correlation surface, wherein indices of the peaks correspond to possible motions.

25. The camera device of clause 21 wherein performing contrast pre-processing occurs before applying a windowing function.
26. The camera device of clause 21 wherein performing contrast pre-processing occurs after applying a windowing function.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of estimating motion in a video programmed in a memory in a device comprising:
   a. performing contrast pre-processing on the video to generate pre-processed data; and
   b. performing phase correlation on the video using the pre-processed data;
   wherein performing contrast pre-processing further comprises:
   a. computing minimum pixel values in an N×N input window;
   b. computing maximum pixel values in the N×N input window; and
   c. re-scaling the pixels in the window to produce an N×N re-scaled output window;
   wherein the re-scaled output window has a first dynamic range of pixels equal to a second dynamic range of input to a Fast Fourier Transform component.

2. The method of claim 1 wherein phase correlation further comprises:
   a. applying a window function to a window of a current frame to obtain a current frame result;
   b. applying a Fast Fourier Transform to the current frame result yielding a first set of complex values;
   c. applying the window function to the window of a reference frame to obtain a reference frame result;
   d. applying the Fast Fourier Transform to the reference frame result yielding a second set of complex values;
   e. normalizing a product of the second set of complex values and a complex conjugate of the first set of complex values;
   f. computing an inverse Fast Fourier Transform to yield a phase correlation surface; and
   g. identifying one or more peaks from the phase correlation surface, wherein indices of the peaks correspond to possible motions.

3. The method of claim 1 wherein performing contrast pre-processing occurs before applying a windowing function.

4. The method of claim 1 wherein performing contrast pre-processing occurs after applying a windowing function.

5. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

6. A system for estimating motion in a video programmed in a device comprising:
   a. a memory for storing an application, the application comprising:
      i. a pre-processing module for performing contrast pre-processing on the video to generate pre-processed data; and
      ii. a phase correlation module for performing phase correlation on the video using the pre-processed data; and
   b. a processor for processing the application;
   wherein the pre-processing module further comprises:
      a. a minimum pixel value module for computing minimum pixel values in an N x N input window;
      b. a maximum pixel value module for computing maximum pixel values in the N×N input window; and
      c. a re-scaling module for re-scaling the pixels in the window to produce an N×N re-scaled output window;
   wherein the re-scaled output window has a first dynamic range of pixels equal to a second dynamic range of input to a Fast Fourier Transform component.

7. The system of claim 6 wherein the phase correlation module further comprises:
   a. a first window function module for applying a window function to a window of a current frame to obtain a current frame result;
   b. a first Fast Fourier Transform module for applying a Fast Fourier Transform to the current frame result yielding a first set of complex values;
   c. a second window function module for applying the window function to the window of a reference flame to obtain a reference frame result;
   d. a second Fast Fourier Transform module for applying the Fast Fourier Transform to the reference frame result yielding a second set of complex values;
   e. a normalizing module for normalizing a product of the second set of complex values and a complex conjugate of the first set of complex values;
   f. an inverse Fast Fourier Transform module for computing an inverse Fast Fourier Transform to yield a phase correlation surface; and
   g. a peak identification module for identifying one or more peaks from the phase correlation surface, wherein indices of the peaks correspond to possible motions.

8. The system of claim 6 wherein performing contrast pre-processing occurs before applying a windowing function.

9. The system of claim 6 wherein performing contrast pre-processing occurs after applying a windowing function.

10. The system of claim 6 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray@ writer/player, a television and a home entertainment system.

11. A device for estimating motion in a video comprising:
    a. a memory for storing an application, the application for:
       i. performing contrast pre-processing on the video to generate pre-processed data; and
       ii. performing phase correlation on the video using the pre-processed data; and
    b. a processing component coupled to the memory, the processing component configured for processing the application;

wherein performing contrast pre-processing further comprises:
   a. computing minimum pixel values in an N×N input window;
   b. computing maximum pixel values in the N×N input window; and
   c. a re-scaling module for re-scaling the pixels in the window to produce an N×N re-scaled output window;
wherein the re-scaled output window has a first dynamic range of pixels equal to a second dynamic range of input to a Fast Fourier Transform component.

12. The device of claim 11 wherein phase correlation further comprises:
   a. applying a window function to a window of a current frame to obtain a current frame result;
   b. applying a Fast Fourier Transform to the current frame result yielding a first set of complex values;
   c. applying the window function to the window of a reference frame to obtain a reference frame result;
   d. applying the Fast Fourier Transform to the reference frame result yielding a second set of complex values;
   e. normalizing a product of the second set of complex values and a complex conjugate of the first set of complex values;
   f. computing an inverse Fast Fourier Transform to yield a phase correlation surface; and
   g. identifying one or more peaks from the phase correlation surface, wherein indices of the peaks correspond to possible motions.

13. The device of claim 11 wherein performing contrast pre-processing occurs before applying a windowing function.

14. The device of claim 11 wherein performing contrast pre-processing occurs after applying a windowing function.

15. A camera device comprising:
   a. a video acquisition component for acquiring a video;
   b. an encoder for encoding the image, including motion estimation, by:
     i. performing contrast pre-processing on the video to generate pre-processed data; and
     ii. performing phase correlation on the video using the pre-processed data; and
   c. a memory for storing the encoded video;
wherein performing contrast pre-processing further comprises:
   a. computing minimum pixel values in an N×N input window;
   b. computing maximum pixel values in the N×N input window; and
   c. a re-scaling module for re-scaling the pixels in the window to produce an N×N re-scaled output window;
wherein the re-scaled output window has a first dynamic range of pixels equal to a second dynamic range of input to a Fast Fourier Transform component.

16. The camera device of claim 15 wherein phase correlation further comprises:
   a. applying a window function to a window of a current frame to obtain a current frame result;
   b. applying a Fast Fourier Transform to the current frame result yielding a first set of complex values;
   c. applying the window function to the window of a reference frame to obtain a reference frame result;
   d. applying the Fast Fourier Transform to the reference frame result yielding a second set of complex values;
   e. normalizing a product of the second set of complex values and a complex conjugate of the first set of complex values;
   f. computing an inverse Fast Fourier Transform to yield a phase correlation surface; and
   g. identifying one or more peaks from the phase correlation surface, wherein indices of the peaks correspond to possible motions.

17. The camera device of claim 15 wherein performing contrast pre-processing occurs before applying a windowing function.

18. The camera device of claim 15 wherein performing contrast pre-processing occurs after applying a windowing function.

* * * * *